March 28, 1939.      E. R. BARRETT      2,151,886
LIFTING DEVICE
Filed Oct. 20, 1937      4 Sheets-Sheet 1
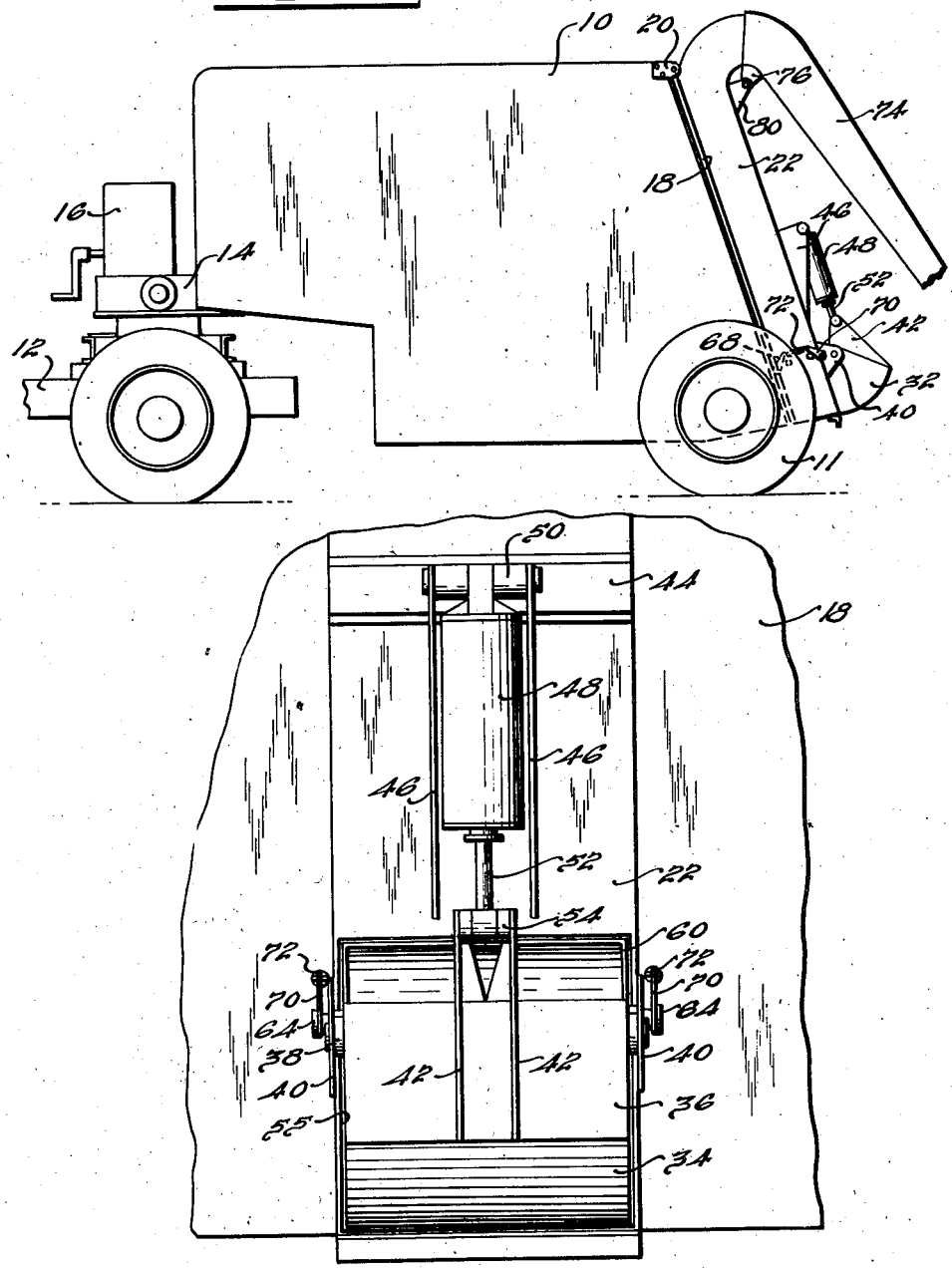
INVENTOR
Edward R. Barrett.
BY Harness, Dickey & Pierce
ATTORNEYS.

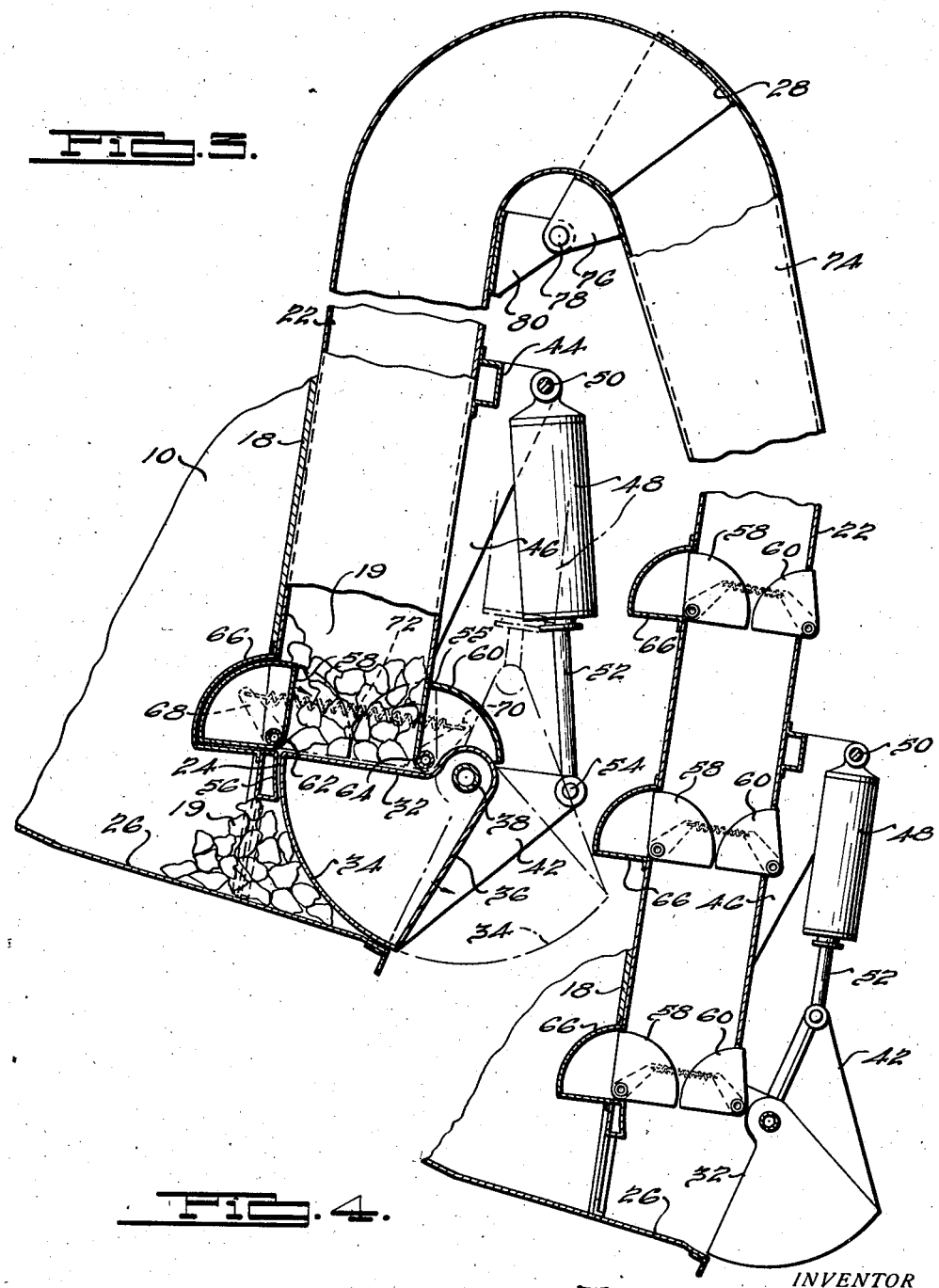

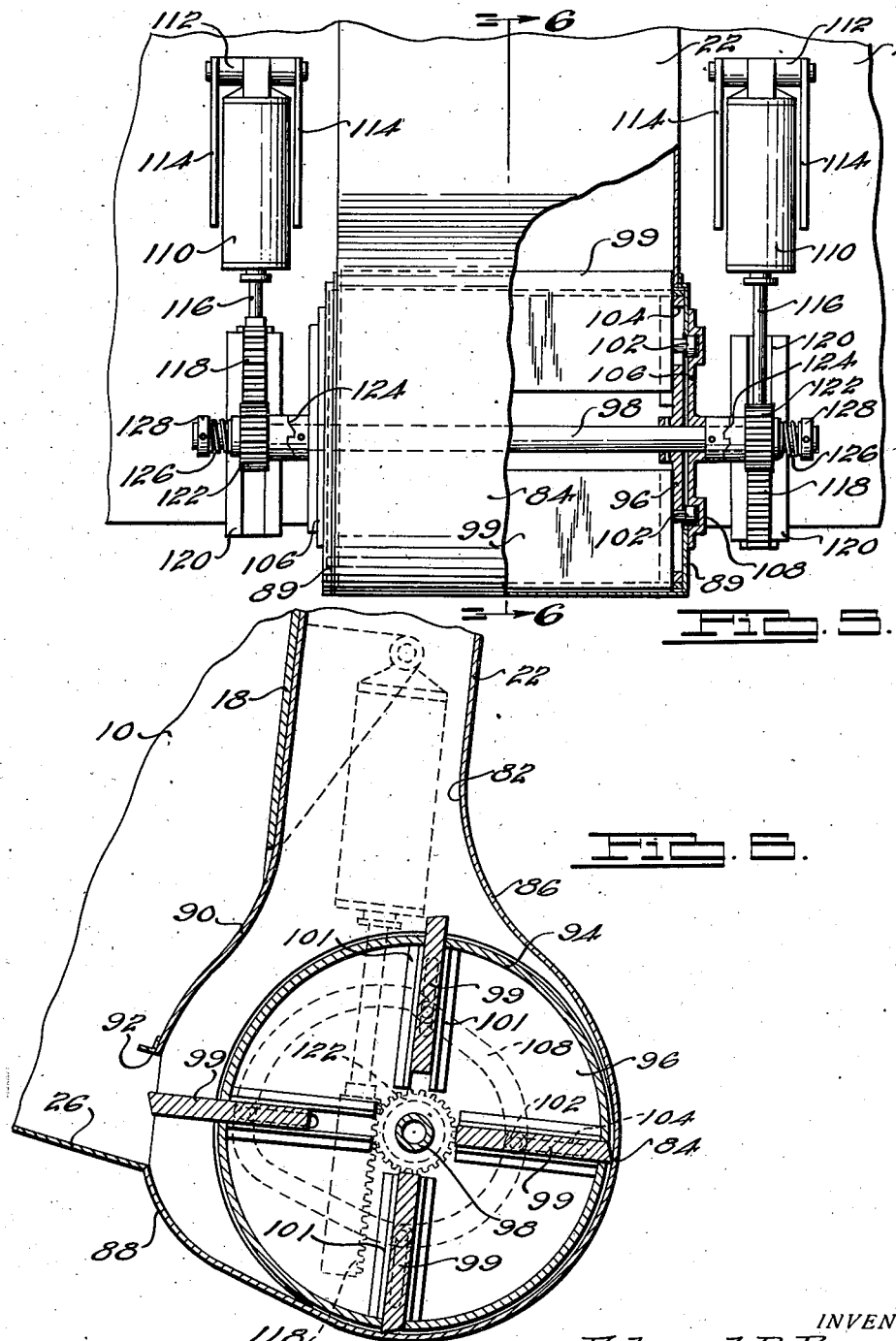

March 28, 1939.　　　　E. R. BARRETT　　　　2,151,886
LIFTING DEVICE
Filed Oct. 20, 1937　　　　4 Sheets-Sheet 4

INVENTOR
Edward R. Barrett.
BY
Harness, Dickey & Pierce.
ATTORNEYS.

Patented Mar. 28, 1939

2,151,886

UNITED STATES PATENT OFFICE 2,151,886

LIFTING DEVICE

Edward R. Barrett, Detroit, Mich., assignor to Gar Wood Industries, Inc., Detroit, Mich., a corporation of Michigan Application October 20, 1937, Serial No. 170,059

11 Claims. (Cl. 214—83)

This invention relates to a lifting device and particularly relates to a lifting device for unloading solid material from a container, such as a truck body.

One of the primary objects of the present invention is to provide a mechanically operated means by which solid material, such as coal, contained within a receptacle, such as a truck body, may be raised and discharged from the receptacle.

A further object of the present invention is to provide a lifting device whereby solid material may be readily discharged from a truck body and in being discharged may be distributed by gravity into a chute or bin.

Another object of the present invention is to provide a lifting device for lifting and discharging solid material from a truck body, which may be operated from a power take-off of the vehicle engine.

Another object of the present invention is to provide a lifting device which is secured to the rear face of the tail gate of a tiltable truck body for lifting and discharging solid material from the truck body.

Another object of the present invention is to provide a lifting device for lifting and discharging solid material from a truck body of such a rugged character that in operation clogging of the material being raised is prevented.

Other objects of the invention will become apparent from the following specification, the drawings relating thereto, and from the claims hereinafter set forth.

In the drawings in which like numerals are used to designate like parts in the several views throughout:

Figure 1 is a fragmentary, side-elevational view of a vehicle truck and truck body embodying the features of the present invention;

Fig. 2 is a fragmentary, rear elevational view, of the structure illustrated in Fig. 1;

Fig. 3 is a fragmentary, broken, vertical, cross-sectional view of the lifting structure illustrated in Fig. 1;

Fig. 4 is a fragmentary, vertical, sectional view similar to Fig. 3, illustrating a modified embodiment of the present invention;

Fig. 5 is a fragmentary, rear elevational view with parts broken away, showing parts in cross-section of a modified form of the present invention;

Fig. 6 is a cross-sectional view taken substantially along the line 6—6 of Fig. 5;

Fig. 7 is a fragmentary, vertical, cross-sectional view, looking in a direction the same as that of Figs. 2 and 5, of a preferred form of the present invention;

Fig. 8 is a fragmentary, cross-sectional view taken substantially along the line 8—8 of Fig. 7; and Fig. 9 is an elevational view of one of the vanes of the structure illustrated in Figs. 7 and 8.

Referring to the drawings, and referring particularly to Figs. 1 to 3, a vehicle body 10 of the trailer type is illustrated, having wheels 11 at the rear thereof. The front of the body 10 is connected to the rear end of an automotive truck 12 through a suitable universal connection 14 which has associated therewith a suitable hoisting power unit 16, by which the front of the body 10 may be raised to tilt the body about its rear wheels 11.

The vehicle body 10 is provided with a sloping rear wall, which has an end gate 18 pivotally secured to the rear wall by pivots 20 at the sides and adjacent the top of the rear wall. The end gate 18 may be normally secured to the rear wall by means of suitable clamps, not shown, which may be released to permit the end gate 18 to pivot about the pivot 20.

The body 10 is adapted to contain a solid material such as coal 19, which is to be lifted and discharged from the body and conveyed to the point of discharge, such as a coal chute or bin. In order to convey the coal from the vehicle, an upstanding conduit 22, which is substantially rectangular in cross-sectional shape, is secured to the end gate 18, preferably at substantially the transverse center of the end gate. The conduit 22 has an inlet opening 24 disposed above the floor 26 of the body 10 in spaced relation thereto. The conduit 22 is curved at its upper end and has a downwardly directed outlet opening 28.

The truck body 10 may be progressively tilted as the discharge progresses so that the coal 19 flows toward the rear end of the body 10; and the coal is forced upwardly into the conduit 22 through the inlet opening 24 by means of an oscillating lifting member 32. In the embodiment illustrated, the lifting member 32 has a solid lifting face, a curved wall member 34, and a rear wall member 36. It is to be understood, however, that the lifting member 32 may take other forms, such for example as a fork-like structure, formed by spaced or grille members forming the lifting face of the lifting member. The lifting member 32 is pivoted about a pivot rod 38 which is secured to brackets 40 which are in turn secured to the rear face of the conduit 22.

Outstanding and upstanding spaced plate members 42 are suitably secured as by spot welding for example, to the rear wall 36. A transverse brace 44 is also secured to the rear face of the conduit member 22 above the lifting member 32. Spaced brackets 46 are suitably secured to the brace 44 and to the rear face of the conduit 22, which provide a support for a hydraulic cylinder 48 on a pivot 50. The cylinder 48 carries a piston having a rod 52 which extends downwardly and which is pivoted at 54 to the plate members 42.

The power for operating the rod 52 may be supplied by a suitable power take-off of the truck in a manner such as that disclosed in the copending application of Edward L. Barrett, Serial No. 177,451, filed December 1, 1937. Fluid is delivered from a pump driven by the truck engine or the power device 16, through a suitable conductor and by suitable valves, for automatically effecting the oscillation of the lifting member 32.

The lifting member 32 is normally in its outermost position with the piston rod 52 raised and upon the down power stroke of the rod 52 the lifting member 32 is caused to oscillate clockwise, as viewed in Fig. 3, and moves through an opening 55 in the rear face of the conduit member 22. The coal against the lifting face of the lifting member 32 is thus supported and raised by the lifting face and moved upwardly through the inlet opening 24 into the conduit 22. A transversely extending guide plate 56 is provided adjacent the inner edge of the opening 24 for assisting in guiding the coal into the conduit 22.

To keep the coal 19 from backing down through the conduit 22, complementary valve members 58 and 60, having cross-sectional shapes substantially that of segments of a circle, are pivotally mounted about pivots 62 and 64, respectively. A cover member 66, complementary in shape to the shape of the valve member 58, is secured to the inner face of the conduit 22 within the vehicle 10 for shielding the valve member 58 from the material within the body.

The members 58 and 60 are normally urged to the position shown by the broken lines in Fig. 3, so as to close the conduit 22 and prevent the downward passage of coal therefrom. Arm members 68 and 70 are secured to the outer ends of the pivot members 62 and 64 and are connected at their uppermost ends by coil springs 72. The coil springs 72 with the arms 68 and 70 thus constantly urge the valve members 58 and 60 to their closed position, but permit opening of the valve members against the action of the springs 72. Thus, when the coal 19 is raised upwardly through the inlet opening 24, the coal itself forces the valve members 58 and 60 apart and permits the lifting of the coal within the conduit 22. The rear face of the valve member 60 is left open so as to permit the free movement of the member 60 to its outermost position, as indicated by the full lines in Fig. 4.

The intermittent oscillation of the lifting member 32 thus raises the coal into the conduit members 22, past the valve members 58 and 60. Upon downward movement of the lifting member 32, the valve members 58 and 60 are moved to their closed position by means of the spring 72 and thus support the coal within the conduit member 22. The continued shoving of coal into the conduit by the lifting member 32 thus raises the coal upwardly through the conduit and when the conduit is filled, the coal discharges through the outlet opening 28.

In order to direct the discharge of the coal from the outlet opening 28 to a suitable point, such as bin or coal chute, an elongated discharge conduit member 74 is pivotally mounted in telescopic relation to the conduit member 22 adjacent the outlet 28. A bracket 76 may be secured to the under surface of the conduit member 74 and is pivotally mounted by the pivot 78 to a bracket 80 secured to the conduit member 22.

In the modified embodiment of the structure illustrated in Fig. 4, instead of supporting the entire column of material by a single pair of complementary valve members 58 and 60, a plurality of the valve members 58 and 60 are provided in spaced relation along the length of the upstanding portion of the conduit member 22. Thus, each of the pairs of valve members supports only a portion of the column of material thereabove and more effectively prevents the downward return of material from the conduit.

Referring to Figs. 5 and 6, a modified embodiment of the present invention is illustrated in which the conduit 22 has an inlet opening 82 disposed above the floor 26 adjacent the rear of the body 10. A housing 84 is disposed below the conduit 22 and is joined to the conduit 22 by a curved portion 86 so as to eliminate corners and facilitate the flow of the material into and through the conduit 22. The lower wall of the housing 84 is also disposed beneath the floor 26 and is connected to the floor by a curved portion 88 so that the material from the body 10 may flow into the housing. End walls 89 complete the housing; and a wall member 90 extends within the body 10 and terminates above the floor to provide an inlet opening 92 into the space within the housing 84.

To lift the solid material such as coal into the conduit 22 for discharge from the truck 10, a cylindrical member 94, having end walls 96, is mounted within the housing 84. A drive shaft 98 extends through openings in the end walls 96 and is fixed to the end walls for rotating the cylinder.

A plurality of reciprocating lifting vanes 99 extend through slots in the cylindrical member 94 and are substantially the width of the cylinder. The vanes 99 are supported and guided by guide plates 101 mounted on the end walls 96 at each end of the vane. The vanes 99 are thus adapted to slide radially outwardly and inwardly within the spaces between the guide members 101 so as to engage and lift the solid material and force the solid material through the inlet opening 82 upwardly through the conduit 22.

To control the extent and timing of movement of the vanes 99, cam followers 102 are fixed to the opposite side edges of the vanes and extend through elongated slots 104 in the end walls 96. Similar cam plates 106 are fixed to the housing end walls 89 and have a continuous cam track 108 which receives the cam followers 102 therein. The cam track 108 is so designed that as the cylinder 94 rotates in a clockwise direction, viewing Fig. 6, the vanes 99 as they approach the inlet opening 92 are caused to move radially outwardly and engage the solid material passed through the opening 92 and lift the solid material upwardly into the conduit 22. The vanes 99, after reaching their outermost position, which is a position slightly to the left of a vertical through the shaft 98, viewing Fig. 6, are caused to rapidly move radially inwardly so that jamming of the coal or other solid material against the curved wall portion 86 is prevented. The vanes 99 are then drawn inwardly so that they are substantially flush with the outer surface of the cylindrical member 94 and remain in this position until they again reach a position approaching the inlet opening 92.

When the solid material is being unloaded the cylindrical member 94 is driven continuously in a clockwise direction, viewing Fig. 6, by means including hydraulic cylinders 110 which are pivotally mounted on pivots 112. The pivots 112 are supported by brackets 114 which in turn are mounted on the outer face of the end gate 18. A piston is slidably received within each of the cylinders and has a downwardly directed piston rod 116 to which a rack 118 is secured at the lower end of each rod. Each rack 18 is guided within spaced guide members 120 and is adapted to mesh with a pinion 122.

Each pinion 122 is secured to one half of a one-way clutch 124 and is freely received over each outer end of the drive shaft 98. The complementary half of the one-way clutch 124 is fixed to the shaft 98 so as to cause rotation of the drive shaft 98 and thus drive the cylinder 94. The two halves of the clutch 124 are urged into engagement by a spring 126 which is received over each end of the drive shaft and held in place by means of a collar 128.

The fluid for actuating the rods 116 and the racks 118 may be supplied to each of the cylinders 110 in the same manner as described above in connection with the cylinder 48. In the embodiment illustrated, the power stroke of the rod 116 is on the upstroke so that upon the upstroke the rack 118 engages the pinion 122 and causes rotation of the drive shaft 98 and therefore rotates the cylinder 94. So that the operation of the cylinder 94 may be continuous, the two cylinders 110 are so timed relative to each other that one of the cylinders is in its up power stroke while the other cylinder is in its down idle stroke. It is pointed out that considerable power may be provided by the hydraulic cylinders 110 through the rack 118 and pinion 122, and the parts are of such a rugged nature, that in the event that the materials being discharged clog within any of the passages, sufficient power may be applied to break up the clogged condition even to the extent of crushing the material.

Referring to Figs. 7 to 9, a preferred embodiment of the invention is illustrated in which the conduit 22 is disclosed adacent the rear face of the truck body, as in the embodiment previously described. A housing 84, as in the embodiment illustrated in Figs. 5 and 6, is disposed below the conduit 22, and is joined to the conduit 22 by a curved portion 86 so as to eliminate corners and facilitate the flow of material into and through the conduit 22. The lower wall of the housing 84 is also disposed beneath the floor 26 and is connected to the floor 26 by means of a transversely extending relief wing member 132. The wing member 132 is pivotally mounted to the forward edge of the housing 84 by means of a pivot pin 134. A lever arm 136 is fixedly secured to the pivot pin 134 and has a spiral spring 138 connected at its outer end and connected to the floor 26 so that the relief wing 132 is constantly urged inwardly. The sides of the housing 84 are closed by substantially circular side members 140 which have hub portions 142. The end members 140 are mounted and secured against rotation by means of clips 144 which are suitably fixed to the conduit member 22. Pin members 146 are fixed to the end members 140 and are slidably received through openings 148 in the clips 144 so that the end members 140 are free to slide inwardly upon the pins 146 but are prevented from rotating.

A substantially cylindrical rotor member, generally indicated at 150, is disposed within the housing in spaced relation to the walls of the housing 84 so as to provide a discharge conduit 152 which communicates with the conduit 22. A transversely extending guard member 154 is fixed to the inner wall of the conduit member 22 above the rotor 150 and defines an inlet opening 156 through which the material from the truck body passes. Another transversely extending wall member 158 is suitably mounted to the guard member 154 and is disposed within the housing 84 above the rotor 150 to define a portion of the conduit 152 for guiding the material in its passage into the discharge conduit 22.

The cylindrical rotor 150 is split along a substantially center line 160 and complementary bosses 162 and 164 are provided on the two halves of the rotor at spaced intervals therearound on the inner surface of the rotor for securing the two halves together. The arrangement is preferably such that one of the halves of the rotor overlaps one of the bosses, as indicated in Fig. 7 so as to provide a rugged construction. Suitable pins 166 are provided for removably attaching the bosses 162 and 164 together.

The rotor 150 is provided with outwardly extending tubular portions 168 at substantially its center which are rotatably received within the hubs 142 for rotatably mounting the rotor 150 within the housing. The tubular portions 168 are provided with annular shoulders 169. Spiral springs 170 are mounted in surrounding relation to the tubular portions 168 and engage the shoulders 169 and the outer edges of the hubs 142 for resiliently urging the end members 140 against the end walls of the rotor 150.

A plurality of reciprocating vanes 172, 174, and 176 extend through slots 178 provided in the outer peripheral surface and also extend radially inwardly through the end walls of the rotor 150. The slots 178 are diametrically opposed in pairs at spaced intervals around the rotor 150 and form guides for the vanes 172, 174 and 176.

Each of the vanes is formed as a unit so that with the three vanes illustrated six ends are provided which extend beyond the outer periphery of the rotor for engaging in lifting the solid material. The vanes 172 and 176 are similar in shape to each other; and each of these vanes is provided with a connecting web portion 180 adjacent one side of each vane. The vane 174 is substantially I shaped, as indicated in Fig. 9, and is provided with a substantially central connecting web 182. Each of the vanes crosses the center of the rotor when the vanes are in position within the rotor and by the construction of the vanes they may be interfitted by placing the vane 174 at the center and by reversing the position of the vanes 172 and 176. By constructing the six lifting portions of the vanes in three pieces it is possible to provide the elements with sufficient strength essential to this kind of heavy duty work. Each of the vanes has fixed thereto cam followers in the form of rollers 184 which are adapted to roll upon the outer peripheral edges of eccentrics 186. Each eccentric 186 is fixedly secured to a stub shaft 188 which extends outwardly through the openings in the tubular portions 168 of the rotor 150. In order to prevent rotation of the shaft 188 and therefore fix the eccentrics 186 against rotation, arm members 190 are fastened to the outer ends of the shafts 188 which are fastened by straps 192 or the like to the rear wall of the vehicle.

Drive means similar to those disclosed in connection with Figures 5 and 6 are provided for rotating the rotor 150. These drive means include pinions 122 which are mounted for free rotation about the shafts 188. The outer ends of the tubular portions 168 may form one-half of a one-way clutch which is adapted to be engaged by the other half 124 of the one-way clutch which in turning is fixed to the pinions 122. Spiral springs 194 are mounted about the shafts 188 and engage the pinions 122 for normally urging the complementary halves of the clutches into engagement. In the embodiment illustrated in Figures 7 and 8, the racks 118 are so arranged relative to the pinions so that the rotor 150 is rotating in counter-clockwise direction as viewed in Fig. 8, and the solid material such as coal which is contained within the truck body flows down through the inlet opening 156 into the housing 84. As the rotor 150 rotates in a counter-clockwise direction the rollers 184 on their respective vanes follow the eccentrics 186 so that each vane as it approaches the inlet opening 156 is moved radially outwardly. This vane thus engages and pushes before it the solid material, forcing the solid material to be moved through the conduit 152 and into and through the conduit 122. In the event of clogging at the entrance to the housing the relief wing 132 will give slightly which will thus relieve the clogging and permit the rotation of the rotor 150 together with the vanes. The solid material is thus forced upwardly through the conduit 22 and discharged at the upper end of the conduit 22 where it may be distributed by gravity as disclosed above.

Formal changes may be made in the specific embodiments of the invention described without departing from the spirit and substance of the invention, the scope of which is commensurate with the appended claims.

What is claimed is:

1. A material lifting device for a truck body comprising, in combination, an end gate on said body, an upstanding conduit member on said end gate having an inlet opening disposed above the floor of said truck body, means for engaging a small portion of said material at said inlet opening and raising it and the material already in said conduit, and means associated with said conduit preventing the return of the material therefrom.

2. A material lifting device for a truck body comprising, in combination, an end gate on said body, an upstanding conduit member on said end gate having an inlet opening disposed above the floor of said truck body and communicating with the interior of the truck body, a movable lifting member disposed adjacent the inlet opening, means for moving said lifting member toward and from said inlet opening within said body to thereby force material from within said body upwardly through said inlet opening into said conduit, and means associated with said conduit preventing the return of material therefrom.

3. A material lifting device for a truck body comprising, in combination, an end gate on said body, an upstanding conduit member on said end gate having an inlet opening disposed above the floor of said truck body and communicating with the interior of the truck body, a movable lifting member disposed adjacent the inlet opening, means for moving said lifting member toward and from said inlet opening to charge said conduit with material from said body, and means associated with said conduit normally closing said conduit against the passage of material therethrough, said last named means being freely movable to permit passage of material therethrough upon movement of said lifting member toward said inlet opening.

4. A material lifting device for a truck body comprising, in combination, an end gate on said body, an upstanding conduit member on said end gate having an inlet opening disposed above the floor of said truck body, an oscillating lifting member disposed adjacent the inlet opening and adjacent the floor of the body, means for moving said lifting member toward and from said inlet opening to charge said conduit with material from said body, complementary cut-off members movably mounted within said conduit, said members being movable to open and closed positions, and means for normally urging said members to their closed position.

5. A material lifting device for a truck body comprising, in combination, an end gate on said body, an upstanding conduit member on said end gate having an inlet opening communicating with the interior of the truck body and disposed above the floor of said truck body, the upper end of said upstanding conduit being curved to provide a downwardly directed outlet opening adjacent the top of said upstanding conduit member, a downwardly extending conduit member having a curved portion complementary in curvature to the curvature of the upstanding conduit mounted in telescopic and pivotal relation to the outlet end of said upstanding conduit member, and means for automatically forcing material from within said body upwardly through said upstanding conduit through the outlet of said upstanding conduit and into said downwardly extending conduit.

6. A material lifting device for a truck body comprising, in combination, an end gate on said body, an upstanding conduit member on said end gate having an inlet opening disposed above the floor of the truck body, an oscillating lifting member disposed adjacent the inlet opening and adjacent the floor of said body, penumatic means for moving said lifting member toward and from said inlet opening to charge said conduit with material from said body, complementary segmental cut-off members pivotally mounted within said conduit, said members being movable to close said conduit against the passage of material therethrough and being movable to open said conduit for the passage of material therethrough, and means normally urging said cut-off members to their closed positions.

7. A material lifting device for a tiltable truck body comprising, in combination, an end gate on said body, an upstanding conduit member on said end gate having an inlet opening disposed above the floor of said truck body, a movable lifting member disposed adjacent the inlet opening, means for moving said lifting member toward and from said inlet opening to charge said conduit with material from said body, means associated with said conduit normally closing said conduit against the passage of material therethrough, said last named means being freely movable to permit passage of material through said conduit upon movement of said lifting member toward said inlet opening, and means for tilting said truck body.

8. A material lifting device for a truck body comprising, in combination, an end gate on said body, an upstanding conduit member on said end gate having an inlet opening communicating with the interior of the truck body, rotatable and reciprocable means so constructed and arranged as to engage material from said body and raise said material upwardly into and through said conduit, and means for rotating and reciprocating said last named means.

9. A material lifting device for a truck body comprising, in combination, an end gate on said body, an upstanding conduit member on said end gate having an inlet opening, a housing disposed beneath said conduit and communicating with said conduit and with the interior of said body, and lifting means disposed within said housing, said lifting means including a cylindrical member having radially reciprocating vanes associated therewith, said vanes extending through openings in said cylindrical member for radial movement outwardly therebeyond, means for rotating said cylindrical member, and means for reciprocating said vanes to move said vanes into engagement with the material within said body to thereby raise said material into and through said conduit.

10. A material lifting device for a truck body comprising, in combination, an end gate on said body, an upstanding conduit member on said end gate having an inlet opening, a housing disposed beneath said conduit and communicating with said conduit and with the interior of said body, and lifting means disposed within said housing, said lifting means including a cylindrical member mounted in spaced relation to the walls of the housing to define a discharge conduit, diametrically extending reciprocating vanes mounted within said cylindrical member, said vanes extending through openings in said cylindrical member for radial movement outwardly therebeyond, means for rotating said cylindrical member and means for reciprocating said vanes to move said vanes into engagement with the material from said body to thereby raise said material into and through said upstanding conduit member.

11. A material lifting device for a truck body, comprising, in combination, an end gate on said body, an upstanding conduit member on said end gate having an inlet opening, a housing disposed beneath said conduit and communicating with said conduit and with the interior of said body, a relief member positioned between the edge of said housing adjacent said body, means resiliently urging said relief member inwardly of said housing, and lifting means disposed within said housing, said lifting means including a cylindrical member having radially reciprocating vanes associated therewith, said vanes extending through openings in said cylindrical member for radial movement outwardly therebeyond, means for rotating said cylindrical member and means for reciprocating said vanes to move said vanes into engagement with the material from said body to thereby raise said material into and through said upstanding conduit member.

EDWARD R. BARRETT.